(12) United States Patent
Payne et al.

(10) Patent No.: US 8,485,165 B2
(45) Date of Patent: *Jul. 16, 2013

(54) FUEL CONTROL SYSTEM AND ASSOCIATED METHOD

(75) Inventors: Edward A. Payne, Greensboro, NC (US); Rodger Karl Williams, Siler City, NC (US)

(73) Assignee: Immixt, LLC, Siler City, NC (US)

( * ) Notice: Subject to any disclaimer, the term of this patent is extended or adjusted under 35 U.S.C. 154(b) by 620 days.

This patent is subject to a terminal disclaimer.

(21) Appl. No.: 12/718,722

(22) Filed: Mar. 5, 2010

(65) Prior Publication Data

US 2010/0161200 A1    Jun. 24, 2010

Related U.S. Application Data

(63) Continuation of application No. 11/696,765, filed on Apr. 5, 2007, now Pat. No. 7,721,720.

(60) Provisional application No. 60/744,587, filed on Apr. 10, 2006.

(51) Int. Cl.
*F02B 13/00* (2006.01)

(52) U.S. Cl.
USPC ........................................................ 123/575

(58) Field of Classification Search
USPC .... 123/510, 575, 576, 577; 701/112; 137/255
See application file for complete search history.

(56) References Cited

U.S. PATENT DOCUMENTS

| 2,911,958 | A | 11/1959 | Griep |
| 3,912,543 | A | 10/1975 | Delahunt |
| 4,323,046 | A | 4/1982 | Barber |
| 4,413,604 | A | 11/1983 | Tune |
| 4,471,744 | A | 9/1984 | Holtz |
| 4,572,133 | A | 2/1986 | Bago |
| 4,712,516 | A | 12/1987 | Eberhardt |
| 4,865,005 | A | 9/1989 | Griffith |
| 4,964,376 | A | 10/1990 | Veach et al. |
| 5,105,063 | A | 4/1992 | Hockemier |

(Continued)

FOREIGN PATENT DOCUMENTS

| DE | 4131626 A1 | 3/1993 |
| DE | 19823335 A1 | 12/1999 |

(Continued)

OTHER PUBLICATIONS

Notice of Allowance for U.S. Appl. No. 11/748,022 mailed May 11, 2012, 5 pages.
Advisory Action for U.S. Appl. No. 11/748,022 mailed Nov. 29, 2011, 3 pages.

(Continued)

*Primary Examiner* — Noah Kamen
*Assistant Examiner* — Hung Q Nguyen
(74) *Attorney, Agent, or Firm* — Withrow & Terranova, PLLC

(57) ABSTRACT

A fuel control system for controlling the purging of alternate fuel in an internal combustion engine at shutdown includes: at least one valve device configured to deliver a fuel supply to the engine; a first fuel source configured to provide a primary fuel to the valve device; a second fuel source configured to provide an alternate fuel to the valve device; and a controller connected to the valve device and adapted to be connected to an ignition system. The controller is configured to control the valve device responsive to a status of one of the engine and the ignition system.

19 Claims, 6 Drawing Sheets

U.S. PATENT DOCUMENTS

| | | | |
|---|---|---|---|
| 5,237,978 | A | 8/1993 | Bailey |
| 5,245,953 | A | 9/1993 | Shimada et al. |
| 5,271,370 | A | 12/1993 | Shimada et al. |
| 5,336,396 | A | 8/1994 | Shetley |
| 5,450,832 | A | 9/1995 | Graf |
| 5,469,830 | A | 11/1995 | Gonzalez |
| 5,505,177 | A | 4/1996 | Herdin et al. |
| 5,662,090 | A | 9/1997 | Ward |
| 5,775,308 | A | 7/1998 | Headley |
| 5,911,210 | A | 6/1999 | Flach |
| 6,016,457 | A | 1/2000 | Toukura et al. |
| 6,035,837 | A | 3/2000 | Cohen et al. |
| 6,112,151 | A | 8/2000 | Kruse |
| 6,145,494 | A | 11/2000 | Klopp |
| 6,260,539 | B1 | 7/2001 | Minowa et al. |
| 6,370,472 | B1 | 4/2002 | Fosseen |
| 6,494,192 | B1 | 12/2002 | Capshaw et al. |
| 6,668,804 | B2 | 12/2003 | Dobryden et al. |
| 6,687,597 | B2 | 2/2004 | Sulatisky et al. |
| 6,698,387 | B1 | 3/2004 | McFarland et al. |
| 6,839,619 | B2 | 1/2005 | Bellinger |
| 6,957,542 | B1 | 10/2005 | Kido et al. |
| 7,019,626 | B1 | 3/2006 | Funk |
| 7,044,103 | B2 | 5/2006 | May |
| 7,107,942 | B2 | 9/2006 | Weissman et al. |
| 7,353,810 | B1 | 4/2008 | Blaschke |
| 7,581,528 | B2 | 9/2009 | Stein et al. |
| 7,640,913 | B2 | 1/2010 | Blumberg et al. |
| 7,721,720 | B2 * | 5/2010 | Payne et al. .................. 123/575 |
| 2002/0011491 | A1 | 1/2002 | Rosen et al. |
| 2002/0152999 | A1 | 10/2002 | Holder et al. |
| 2005/0028791 | A1 | 2/2005 | Niimi |
| 2005/0072384 | A1 | 4/2005 | Hadley et al. |
| 2007/0119429 | A1 | 5/2007 | Jacquay |
| 2008/0262701 | A1 | 10/2008 | Williams et al. |

FOREIGN PATENT DOCUMENTS

| | | |
|---|---|---|
| DE | 19922748 A1 | 11/2000 |
| DE | 10217664 A1 | 11/2003 |
| EP | 1790839 A2 | 5/2007 |
| JP | 2003065094 | 3/2003 |
| JP | 2004190935 | 7/2004 |
| WO | 2006005930 A2 | 1/2006 |

OTHER PUBLICATIONS

Final Office Action for U.S. Appl. No. 11/748,022 mailed Nov. 29, 2010, 7 pages.
Notice of Allowance for U.S. Appl. No. 11/696,765 mailed Jan. 28, 2010, 6 pages.
Non-final Office Action for U.S. Appl. No. 11/696,765 mailed May 28, 2009, 9 pages.
Notice of Allowance for U.S. Appl. No. 11/346,052 mailed Apr. 19, 2011, 2 pages.
Notice of Allowance for U.S. Appl. No. 11/346,052 mailed Apr. 1, 2011, 5 pages.
Final Office Action for U.S. Appl. No. 11/346,052 mailed Nov. 30, 2010, 7 pages.
Non-final Office Action for U.S. Appl. No. 11/346,052 mailed Apr. 28, 2010, 7 pages.
Non-final Office Action for U.S. Appl. No. 11/346,052 mailed Nov. 20, 2007, 5 pages.
Final Office Action for U.S. Appl. No. 11/346,052 mailed Apr. 17, 2008, 6 pages.
Non-final Office Action for U.S. Appl. No. 11/346,052 mailed Nov. 28, 2007, 5 pages.
Non-final Office Action for U.S. Appl. No. 11/346,052 mailed Apr. 10, 2007, 6 pages.
Notice of Allowance for U.S. Appl. No. 12/105,823 mailed Aug. 6, 2010, 5 pages.
Non-final Office Action for U.S. Appl. No. 12/105,823 mailed Apr. 13, 2000, 4 pages.
Notice of Allowance for U.S. Appl. No. 12/903,754 mailed Nov. 26, 2010, 4 pages.
"Frybrid Diesel/Vegetable Oil," available at http://www.frybrid.com/frybrid.htm, Aug. 23, 2005, 2 pages.
"Greasecar Vegetable Fuel Systems," available at http://greasecar.com/product_detail.cfm, Aug. 23, 2005, 2 pages.
Non-final Office Action for U.S. Appl. No. 13/073,242 mailed Dec. 4, 2012, 8 pages.
Final Office Action for U.S. Appl. No. 13/073,242 mailed Mar. 13, 2013, 6 pages.
Advisory Action for U.S. Appl. No. 13/073,242 mailed May 16, 2013, 3 pages.

* cited by examiner

FUEL CONTROL SYSTEM AND ASSOCIATED METHOD

RELATED APPLICATIONS

The present application is a continuation patent application of U.S. patent application Ser. No. 11/696,765, filed Apr. 5, 2007, entitled "FUEL CONTROL SYSTEM AND ASSOCIATED METHOD," which claims priority to U.S. Provisional Patent Application Ser. No. 60/744,587, filed Apr. 10, 2006, entitled "FUEL CONTROL SYSTEM AND ASSOCIATED METHOD," both of which are incorporated herein by reference in their entireties.

BACKGROUND

1. Field of the Disclosure

The present invention relates to fuel systems for internal combustion engines and more particularly to fuel systems that provide both primary fuel and alternate fuel to an internal combustion engine.

2. Technical Background

For a variety of reasons, most of which relate to environmental and alternative energy pursuits, certain primary fuel engines, such as diesel engines, can be made to accommodate alternate fuels, such as straight vegetable oil (SVO), "biodiesel," and other fuel oils (hereinafter "alternate fuels"). However, practical applications have demonstrated that fulltime use of these alternate fuels is not desirable. For instance, at low temperatures the viscosity of some of these alternate fuels is not optimal for use in an engine designed to run on primary fuel. The alternate fuel should be heated up to a temperature that will allow it to easily pass through the fuel delivery system. If left in an idle engine to cool, the alternate fuel also has a tendency to increase in viscosity and thus congeal or solidify inside the fuel delivery components. Thus, the alternate fuel should not be used until it has reached an appropriate temperature and it should be purged from the engine before shutting down. As a result, some of these systems typically run on diesel fuel during start-up and before shut-down, and rely on the consumer to manually switch to the alternate fuel source in between, i.e., when the alternate fuel is at a usable viscosity. For example, in an automobile that has been modified to include diesel and alternate fuel tanks, a driver can selectively toggle between the two fuels during operation of the vehicle using a switch that controls the flow of the two fuels.

Recently, some aftermarket automated control systems have been designed. These systems control the switching between a diesel fuel source and an alternative fuel source based on the temperature of the alternate fuel. Typically, when the engine is cold, such as during engine start, the engine operates using primary fuel, and once a predetermined alternate fuel temperature or a certain vehicle speed is achieved, the engine is then switched to the alternate fuel. If low temperature operation reoccurs, the engine is then switched back to primary fuel, and so on.

To automate this fuel selection process, various conventional aftermarket control systems have been designed that acquire and monitor alternate fuel temperature by using various measurement devices, such as temperature sensors. However, these aftermarket systems do not address the condition whereby the engine is prematurely shut down during or a short time after alternate fuel operation. Various concentrations of alternate fuel will remain in fuel delivery components. If these fuel delivery components are subsequently allowed to cool, the alternate fuel will congeal or solidify. Fuel flow therefore cannot be reestablished for start-up.

Therefore, an improved system and method of automatically purging an internal combustion engine of alternate fuel are desired.

SUMMARY OF THE DETAILED DESCRIPTION

As a first aspect, embodiments of the invention are directed to a fuel control system for controlling the purging of alternate fuel in an internal combustion engine at shutdown. The system comprises: at least one valve device configured to deliver a fuel supply to the engine; a first fuel source configured to provide a primary fuel to the valve device; a second fuel source configured to provide an alternate fuel to the valve device; and a controller connected to the valve device and adapted to be connected to an ignition system. The controller is configured to control the valve device responsive to a status of one of the engine and the ignition system.

In some embodiments, the controller is configured to detect a duration that the engine operates, the duration ending with a signal from the ignition system to cease operation of the engine. The controller is configured such that it signals the engine to continue to operate if the duration is less than a threshold time period.

As a second aspect, embodiments of the invention are directed to an internal combustion engine assembly capable of operating on primary and alternate fuels, comprising: an internal combustion engine; a first fuel source connected to the engine; a second fuel source connected to the engine; a fuel control unit connected with the first and second fuel sources for regulating fuel to the engine; an ignition system; and a controller connected to the engine, the fuel control unit and the ignition system. The controller is configured to control the fuel control unit responsive to a status of one of the engine and the ignition system.

As a third aspect, embodiments of the invention are directed to a method of controlling the purging of alternate fuel in an internal combustion engine at shutdown. The method comprises the steps of: signaling an internal combustion engine to cease operation, the signaling being carried out with an ignition system; detecting a status of one of the ignition system and the internal combustion engine; and overriding the signal from the ignition system responsive to the detected status such that the engine continues to operate in order to purge alternate fuel.

DETAILED DESCRIPTION OF THE PREFERRED EMBODIMENTS

Figure 1:
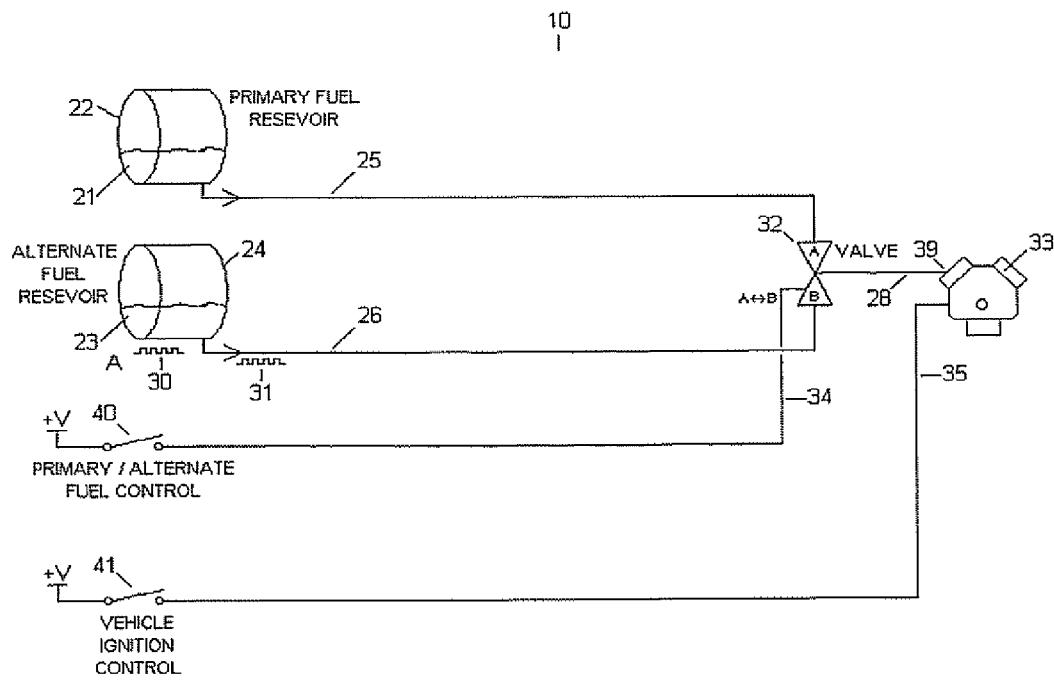
FIG. 1 is a schematic diagram of an alternate fuel system for an internal combustion engine according to the prior art.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" s other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The present invention provides a fuel control system that can generally be used as an inexpensive and easily adaptable solution for purging alternate fuels whose tendency is to congeal or solidify if left within fuel supply and delivery components. For purposes of this application, the term "selectively deliver," and other forms thereof, is defined as providing 100% primary fuel and 0% alternate fuel, or any mixture of primary and alternate fuel sufficient to prevent the tendency to congeal or solidify if left within fuel supply and delivery components. For purposes of description within the accompanying drawings, fuel is presumed delivered by pressure pump, suction pump or gravity, not shown for simplicity, such that when restriction is removed within any fuel flow path, fuel will flow from source to engine. For purposes of description within the accompanying drawings, although fuel presumed delivered by pressure pump or suction pump often requires pressure regulation or excess flow bypass lines for implementation, such pressure regulation or excess flow bypass lines are similarly not shown for simplicity.

Referring now to the drawings and, in particular, to FIG. 1, there is shown for purpose of reference and background a fuel control system 10 in common use for providing primary and alternate fuel to an internal combustion engine. The fuel used by engine 33 having fuel inlet 39 may be primary fuel 21 contained in a first fuel source 22, an alternate fuel 23 contained in a second fuel source 24, or any combination of the primary fuel 21 and the alternate fuel 23. The reference fuel control system 10 depicted in FIG. 1 also includes a valve device 32 to selectively deliver primary fuel and alternate fuel, and a primary fuel and alternate fuel selection control device 40 that asserts control of valve device 32 via electrical line 34. For purposes of this application, the term "valve device" as generally depicted by device 32 is defined as any device capable of controlling in any way the flow of fuel or fuels. It should be noted that in various embodiments, a valve device many or may not include a valve. Also, for purposes of this application, the term "primary fuel and alternate fuel selection control device" as generally depicted by device 40 is defined as any device, or simple or complex system capable of issuing control or requesting the selection or mixing of fuel or fuels.

The reference fuel control system 10 depicted in FIG. 1 also includes an ignition control device 41, typically, but not limited to, the primary ignition switch of the vehicle, wherein control device 41 asserts a voltage, current, or signal via electrical line 35 to permit engine 33 to run, or alternately asserts a differing or absent voltage, current, or signal via line 35 to halt engine 33. For purposes of this application, the term "ignition control device" as generally depicted by device 41 is defined as any device, or simple or complex system capable of controlling the run state of the engine by a variety of mechanisms, including but not limited to direct or indirect control upon fuel pumps, fuel injectors, glow plugs, valves and engine control modules. Also, for purposes of description within this application, the term "ignition," while not technically accurate in the context of a diesel engine, is nevertheless of common public use, parlance and understanding, and herein if and where used describes the ability to enable and disable the run state of engine by a variety of mechanisms, including but not limited to direct or indirect control upon fuel pumps, fuel injectors, glow plugs, valves and engine control modules.

The reference fuel control system 10 depicted in FIG. 1 may also contain heating element 30 for purpose of heating the alternate fuel 23 contained in fuel source 24, and heating element 31 for purpose of heating alternate fuel contained within fuel transmission line 26, with heat applied by such heating elements as present and distributed to liquefy and/or reduce the viscosity of alternate fuel 23 to effect its passage though fuel transmission elements and component devices 26, 28, 32, and 39 for consumption by engine 33.

The reference fuel control system 10 depicted in FIG. 1 possesses shortcomings and failure modes. Specifically, to effect immediate engine start unconditionally upon user demand, the fuel transmission path comprising elements and component devices 26, 28, 32, and 39 between engine 33 and primary fuel 21 must within prior contain either primary fuel 21 or a mixture of primary fuel 21 and alternate fuel 23 of such ratio not subject to congealment or solidification. As a counter-example, if vehicle engine 33 was being operated on alternate fuel 23 or a mixture of primary fuel 21 and alternate fuel 23 subject to congealment or solidification at the time of engine 33 shut-off, fuel transmission element 28, valve device 32, and fuel inlet 39 upon cooling will congeal or solidify within, effectively blocking fuel flow and thereby preventing engine restart. Additional heating elements such as those depicted at 30 and 31 may be added and employed at fuel transmission elements and component devices 28, 32, and 39; however, such elements and component devices, and any fuel contained therein, will require time to heat in addition to the complexity added by the heating elements.

The present invention can address the problem of congealment and solidification within fuel transmission and component devices to provide for immediate engine start or restart availability and vehicle usage without preconditions such as preheating, or dependencies upon user procedures or conditions occurring at prior user engine shutdown, and can do so such by introduction of an electronic controller, status monitoring, and control override mechanisms. Referring to the drawings and, in particular, to FIG. 2, a fuel control system 11 is depicted in a passive state interposed within the basic primary fuel and alternate fuel selection control structure prior depicted in FIG. 1. The fuel used by engine 33 having fuel inlet 28 may be primary fuel 21 contained in a first fuel source 22, an alternate fuel 23 contained in a second fuel source 24, or any combination of the primary fuel 21 and the alternate fuel 23. The fuel control system 11 depicted in FIG. 2 also includes a valve device 32 to selectively deliver primary fuel 21 and alternate fuel 23, and a primary fuel and alternate fuel selection control device 40 that asserts control of valve device 28 through control override mechanism 42 via a control signal on line 34. Furthermore, electronic controller 50 via a status signal on line 54 monitors the state of control device 40.

Figure 2:
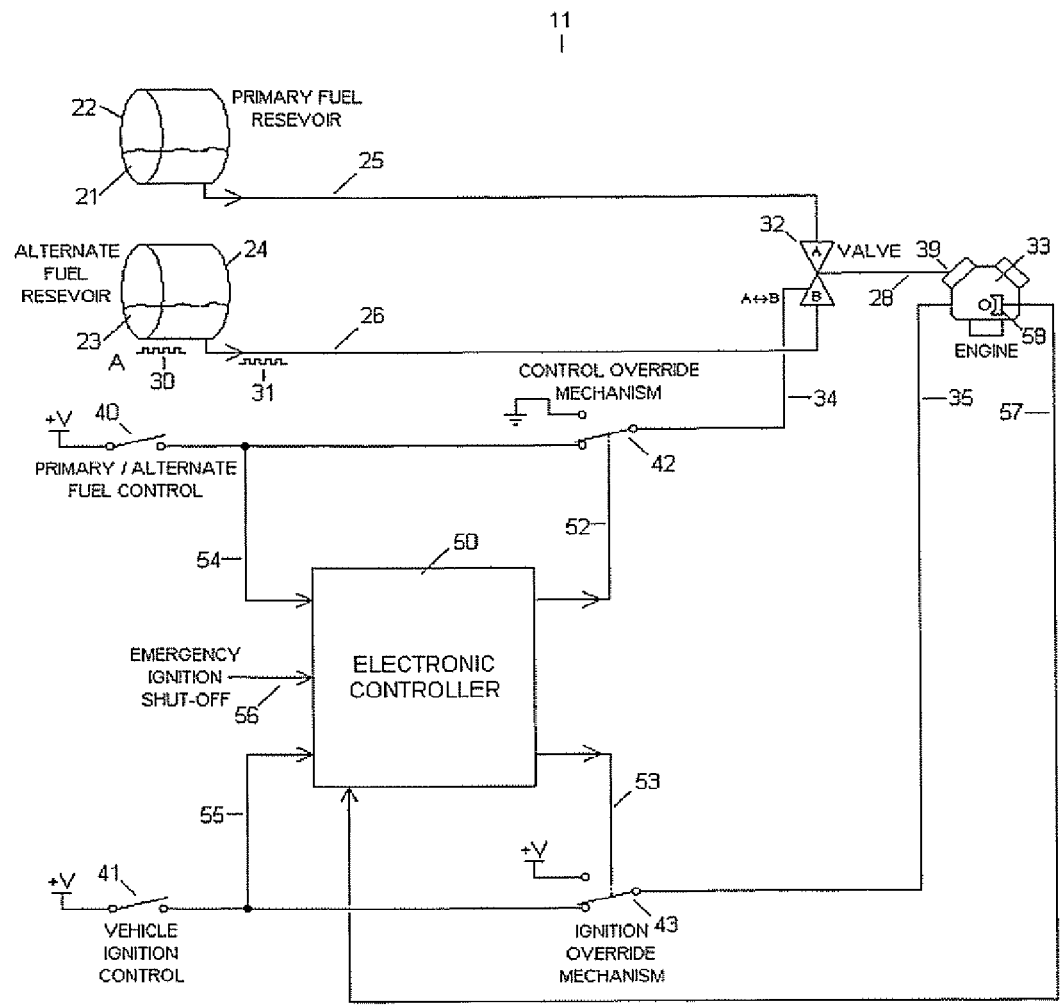
FIG. 2 is a schematic diagram of an alternate fuel system with an ignition system controller according to an embodiment of the present invention, the system being shown in a passive condition.

The fuel control system 11 depicted in FIG. 2 also includes an ignition control device 41, typically, but not limited to, the primary ignition switch of the vehicle, wherein control device 41 asserts a voltage, current, or signal through ignition override mechanism 43 and a control signal on line 35 to permit engine 33 to run, or alternately asserts a differing or absent voltage, current, or signal through ignition override mechanism 43 and line 35 to halt engine 33. Furthermore, electronic controller 50 via a status signal on line 55 monitors the state of ignition control device 41. For purposes of this application, the term "ignition override mechanism" as generally depicted by device 43 is defined any device, or simple or complex system capable of usurping control over the run state of the engine by a variety of mechanisms, including but not limited to gaining direct or indirect control upon fuel pumps, fuel injectors, glow plugs, valves and engine control modules.

The fuel control system 11 may also include an engine run sensor 58, whose purpose is to detect crankshaft rotation by direct or indirect means, and where such crankshaft rotation status is conveyed to electronic controller 50 via a status signal on line 57.

The control override mechanism 42 is itself controlled by the controller 50 via a control signal on line 52. While in the passive state as depicted in FIG. 2, the control override mechanism 42 completely or substantially passes, or completely or substantially reproduces, the signal as provided by the primary and alternate fuel control device 40, effectively passing or reproducing this signal to valve device 32 via line 34.

The ignition override mechanism 43 is itself controlled by the controller 50 via a control signal on line 53. While in the passive state as depicted in FIG. 2, the ignition override mechanism 43 completely or substantially passes, or completely or substantially reproduces, the signal as provided by the vehicle ignition control device 41, effectively passing or reproducing this signal to the engine 33 ignition control input via line 35.

While in the passive state as depicted in FIG. 2, if engine 33 is determined to be running via vehicle ignition control 41 and a status signal on line 55, or alternately by or in conjunction with a separate engine run state status signal on line 57, at such time the status of primary fuel 21 and alternate fuel utilization is monitored as determined by the primary and alternate fuel control 40 via a status signal on line 54 by electronic controller 50. If during this process of monitoring engine 33 via the signal on line 54 and the signals on line 55 or 57 it is subsequently determined by electronic controller 50 that the signal on line 55 has transitioned as to indicate requested engine 33 shutdown via ignition control 41, electronic controller 50 will examine the history of primary fuel and alternate fuel utilization as was monitored by a signal on line 54. If it is determined that primary fuel 21 or a mixture of primary fuel 21 and alternate fuel 23 sufficient to preclude congealment or solidification resides within fuel transmission elements and component devices 28, 32, and 39, then electronic controller 50 will remain the passive state, thereby permitting engine shutdown. Otherwise, if it is determined that alternate fuel 23 or a mixture of primary fuel 21 and alternate fuel 23 insufficient to preclude congealment or solidification resides within fuel transmission elements and component devices 28, 32, and 39, then electronic controller 50 will enter the active state, thereby precluding shutdown, unless an the emergency ignition shutoff signal is asserted on line 56.

Figure 3:
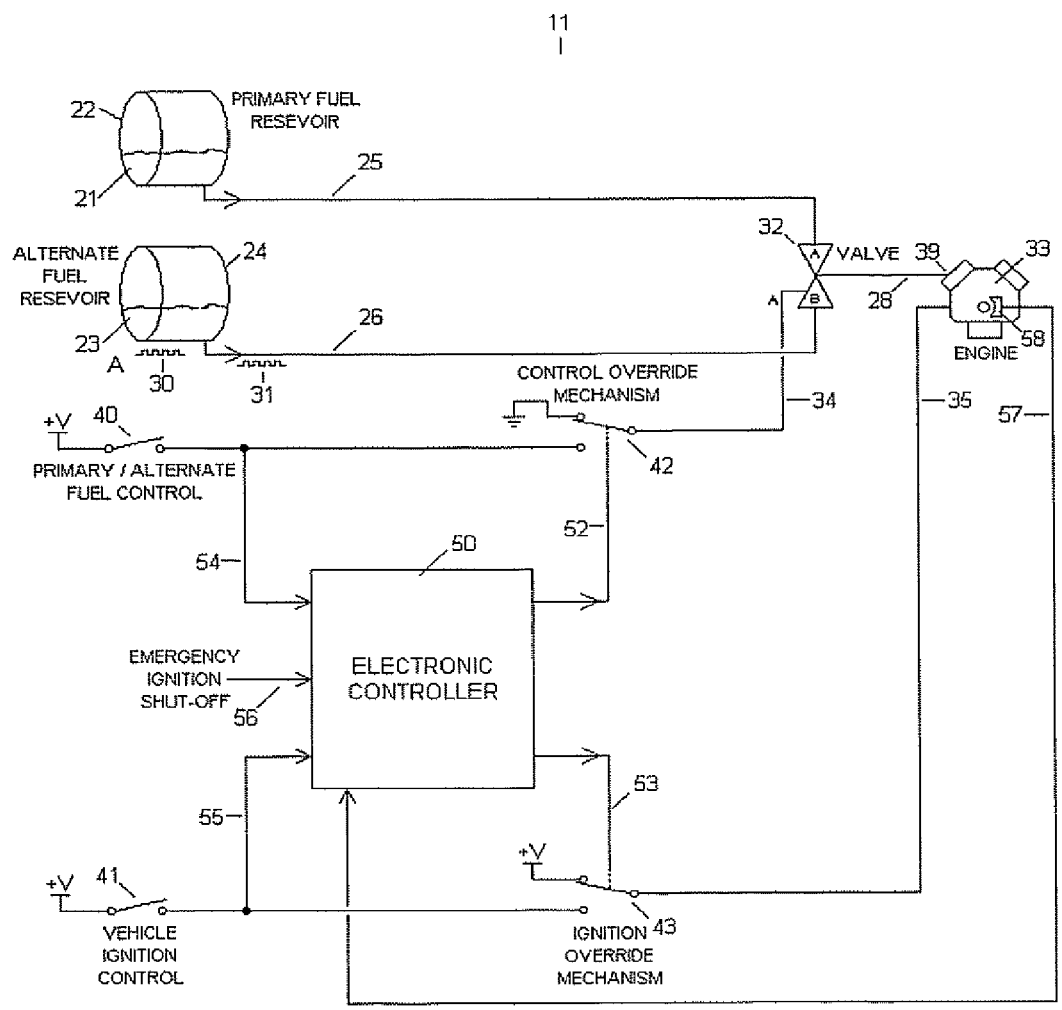
FIG. 3 is a schematic diagram of the alternate fuel system of FIG. 3, the system being shown in an active condition.

Referring to the drawings and, in particular, to FIG. 3, the fuel control system 11 is depicted in the active state vs. the passive state as previously shown in FIG. 2, and similarly interposed within the basic primary fuel and alternate fuel selection control structure prior as depicted in FIG. 1. All elements of FIG. 3 and the descriptions of such elements therein are identical to those of FIG. 2 and apply, however with notable exceptions being the state of control override mechanism 42 and the state of ignition override mechanism 43.

Whereupon having transitioned from the passive state as depicted in FIG. 2 to the active state as depicted in FIG. 3 for reason of determination that alternate fuel 23 or a mixture of primary fuel 21 and alternate fuel 23 insufficient to preclude congealment or solidification resides within fuel transmission elements and component devices 28, 32, and 39, electronic controller 50 asserts control signals on lines 52 and 53. Assertion of a control signal on line 52 causes control override mechanism 42 to substantially disregard the state of the primary alternate fuel control 40, and instead causes the control override mechanism 42 to output a signal via line 34 to valve device 32 of appropriate form or construct such that primary fuel 21 or a mixture of primary fuel 21 and alternate fuel 23 sufficient to preclude congealment or solidification is selected by valve device 32. Furthermore, assertion of a control signal on line 53 causes control override mechanism 43 to substantially disregard the state of vehicle ignition control 41, and instead causes the control override mechanism 42 to output a signal via line 35 to engine 33 of appropriate from and construct such that engine 33 remains in a running state.

While in the active state as depicted in FIG. 3, the assertion of control signals on lines 52 and 53, and in turn the assertion of respective override mechanisms 42 and 43, nominally continues for a period of time as determined by a threshold sufficient for primary fuel 21 or a mixture of primary fuel 21 and alternate fuel 23 sufficient to preclude congealment or solidification to enter and purge substantially all of the alternate fuel from the fuel transmission elements and component devices 28, 32, and 39. Upon expiration of said threshold, electronic controller 50 then ceases assertion of a control signal on line 52, causing control override mechanism 42 to completely or substantially pass, or completely or substantially reproduce the signal as provided by the primary and alternate fuel control device 40, effectively passing or reproducing this signal to valve device 32 via a control signal on line 34. Furthermore, upon expiration of said threshold, electronic controller 50 then ceases assertion of a control signal on line 53, causing ignition override mechanism 43 to completely or substantially pass, or to completely or substantially reproduce the signal as provided by the vehicle ignition control device 41, effectively passing or reproducing this signal to the engine ignition control input via a control signal on line 35.

Upon expiration of said threshold and negation of assertion of control signals on lines 52 and 53, the fuel control system 11 as depicted in FIG. 3 in the active state transitions back to the passive state as depicted in FIG. 2, whereupon it again waits for appropriate conditions as described for and depicted within FIG. 2 before again transitioning into the active state as described for FIG. 3, and so on.

If at any time during the active state as depicted in FIG. 3 the emergency ignition shutoff signal on line 56 is asserted by manual means or by automated sensor including but not limited to vehicle fire, collision, or rollover, the fuel control system 11 may unconditionally negate assertion of control signals on lines 52 and 53 and enter the passive state.

If at any time during the active state as depicted in FIG. 3 electronic controller 50 senses repeated attempts or senses a pattern atypical of normal operation of vehicle ignition control 41 via a status signal on line 55, the fuel control system 11 may unconditionally negate assertion of control signals on lines 52 and 53 and enter the passive state.

If at any time during the passive state as depicted in FIG. 2, the active state as depicted in FIG. 3, the fuel control system 11 in part or total fails or loses electrical power, the system may be implemented such manner that it substantially emulates the passive state.

Figure 4:
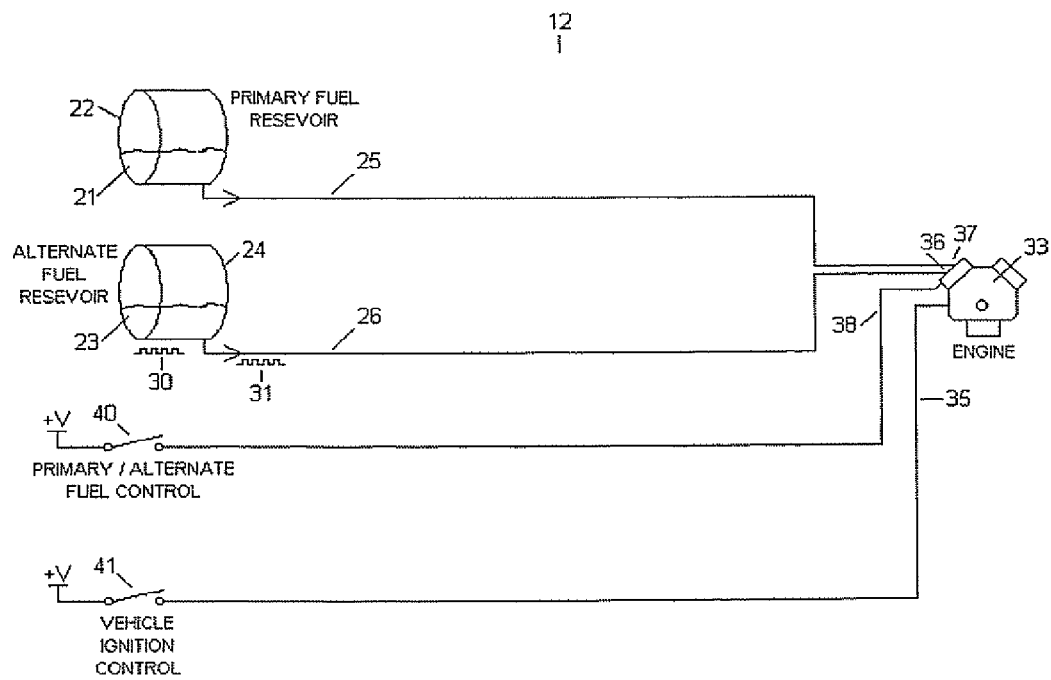
FIG. 4 is a schematic diagram of another alternate fuel system for an internal combustion engine according to the prior art.

Referring now to the drawings and, in particular, to FIG. 4, there is shown for purpose of reference and background a fuel control system 12 for providing primary and alternate fuel to an internal combustion engine. The fuel used by engine 33 having fuel inlets 36 and 37 may be primary fuel 21 contained in a first fuel source 22, an alternate fuel 23 contained in a second fuel source 24, or any combination of the primary fuel 21 and the alternate fuel 23. The reference fuel control system 12 depicted in FIG. 4 also includes a line 38 and alternate fuel selection control device 40 that asserts control via line 38. For purposes of this application, the term "primary fuel and alternate fuel selection control device" as generally depicted by device 40 is defined as any device, or simple or complex system capable of issuing control or requesting the selection or mixing of fuel or fuels.

The reference fuel control system 12 depicted in FIG. 4 also includes an ignition control device 41, typically, but not limited to, the primary ignition switch of the vehicle, wherein control device 41 asserts a voltage, current, or signal via line 35 to permit engine 33 to run, or alternately asserts a differing or absent voltage, current, or signal via line 35 to halt engine 33.

The reference fuel control system 12 depicted in FIG. 4 may also contain heating element 30 for purpose of heating the alternate fuel 23 contained in fuel source 24, and heating element 31 for purpose of heating alternate fuel contained within fuel transmission line 26, with heat applied by such heating elements as present and distributed to liquefy and/or reduce the viscosity of alternate fuel 23 to effect its passage though fuel transmission elements and component devices 26 and 36 for consumption by engine 33.

The reference fuel control system 12 depicted in FIG. 4 possesses shortcomings and failure modes. Specifically, to effect immediate engine start unconditionally upon user demand, the fuel transmission path comprised of elements and component devices 26 and 36 between engine 33 and primary fuel 21 must within prior contain either primary fuel 21 or a mixture of primary fuel 21 and alternate fuel 23 of such ratio not subject to congealment or solidification. As a counter-example, if vehicle engine 33 was being operated on alternate fuel 23 or a mixture of primary fuel and alternate fuel subject to congealment or solidification at the time of engine shut-off fuel transmission element 26 and fuel inlet 36 upon cooling will congeal or solidify within, effectively blocking fuel flow and thereby preventing engine restart. Additional heating elements such as those depicted at 30 and 31 may be added and employed at fuel transmission elements and component devices; however, such elements and component devices, and any fuel contained therein, will require time to heat in addition to the complexity added by said heating elements.

A different embodiment of the present invention addresses the problem of congealment and solidification to provide for immediate engine start or restart availability and vehicle usage without preconditions such as preheating, or dependencies upon user procedures or conditions occurring at prior user engine shutdown, and does such by introduction of an electronic controller, status monitoring, and control override mechanisms. Referring to the drawings and, in particular, to FIG. 5, a fuel control system 13 is depicted in a passive state interposed within the basic primary fuel and alternate fuel selection control structure prior depicted in FIG. 4. The fuel used by engine 33 having fuel inlets 36 and 37 may be primary fuel 21 contained in a first fuel source 22, an alternate fuel 23 contained in a second fuel source 24, or any combination of the primary fuel 21 and the alternate fuel 23. The fuel control system 13 depicted in FIG. 5 also includes engine 33 capable of accepting primary fuel 21 and alternate fuel 23, and a primary fuel and alternate fuel selection control device 40 that asserts control of engine 33 fuel selection through control override mechanism 42 via control signals on line 38. Furthermore, electronic controller 50 via a status signal on line 54 monitors the state of control device 40.

Figure 5:
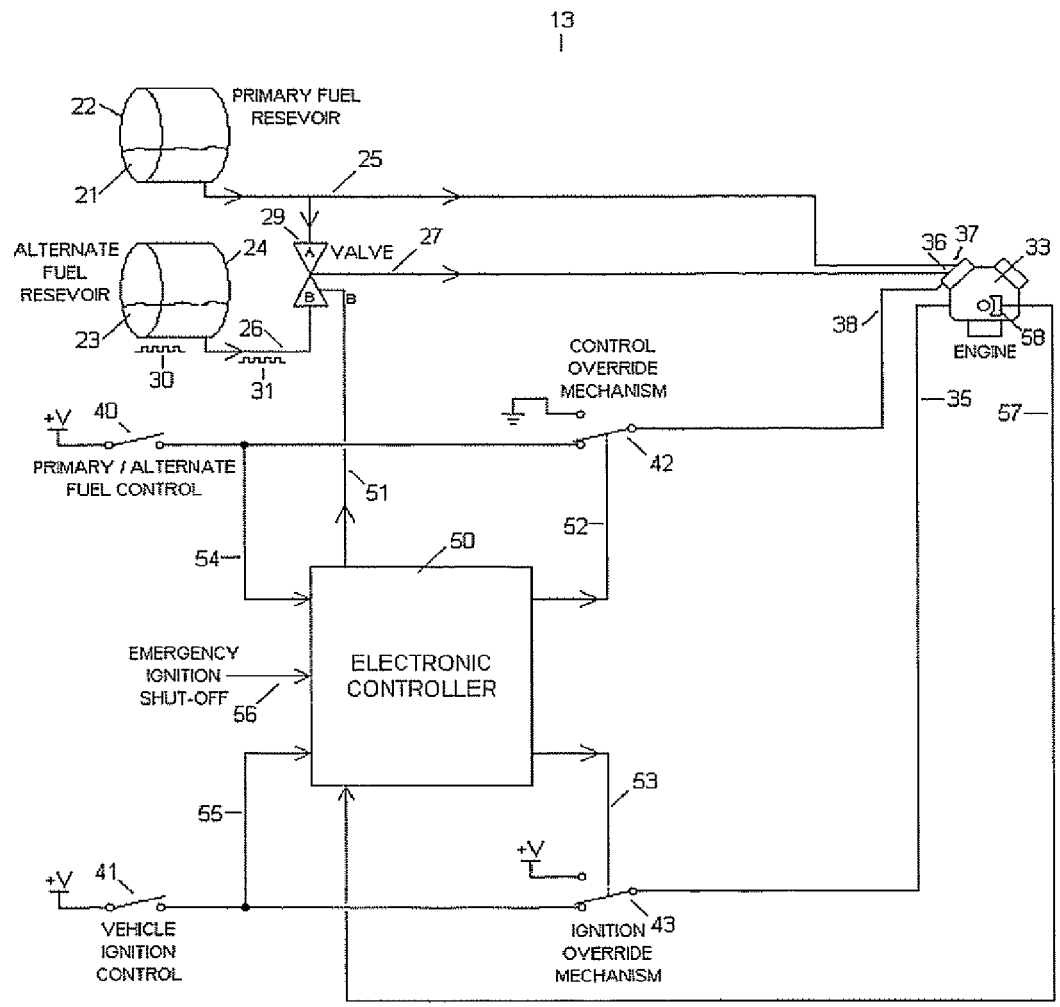
FIG. 5 is a schematic diagram of an alternate fuel system with an ignition system controller according to additional embodiments of the present invention, the system being shown in a passive condition.

The fuel control system 13 depicted in FIG. 5 also includes a valve device 29 to selectively deliver primary fuel 21 and alternate fuel 23 through alternate fuel transmission line 27 and engine inlet 36, and a primary fuel 21 and alternate fuel selection control signal line 51 that connects valve device 29 and electronic controller 50.

The fuel control system 13 depicted in FIG. 5 also includes an ignition control device 41, typically, but not limited to, the primary ignition switch of the vehicle, wherein control device 41 asserts a voltage, current, or signal through ignition override mechanism 43 and line 35 to permit engine 33 to run, or alternately asserts a differing or absent voltage, current, or signal through ignition override mechanism 43 and line 35 to halt engine 33. Furthermore, electronic controller 50 via a status signal on line 55 monitors the state of ignition control device 41.

The fuel control system 13 may also include an engine run sensor 58, whose purpose is to detect crankshaft rotation by direct or indirect means, and where such crankshaft rotation status is conveyed to electronic controller 50 via a status signal on line 57.

Valve device 29 is itself controlled by control signals on line 51. While in the passive state as depicted in FIG. 5, the valve device 29 completely or substantially directs alternate fuel 23 from fuel transmission line 26 to fuel transmission line 27.

The control override mechanism 42 is itself controlled by control signals on line 52. While in the passive state as depicted in FIG. 5, the control override mechanism 42 completely or substantially passes, or completely or substantially reproduces, the signal as provided by the primary and alternate fuel control device 40, effectively passing or reproducing this signal to engine 33 to effect fuel selection via control signals on line 38.

The ignition override mechanism 43 is itself controlled by control signals on line 53. While in the passive state as depicted in FIG. 5, the ignition override mechanism 43 completely or substantially passes, or completely or substantially reproduces, the signal as provided by the vehicle ignition control device 41, effectively passing or reproducing this signal to the engine 33 ignition control input via control signals on line 35.

While in the passive state as depicted in FIG. 5, if engine 33 is determined to be running via vehicle ignition control 41 and status signals on line 55, or alternately by or in conjunction with separate engine run state status signals on line 57, at such time the status of primary fuel 21 and alternate fuel 23 utilization is monitored as determined by the primary and alternate fuel control 40 via a status signal on line 54 by electronic controller 50. If during this process of monitoring engine 33 via a signal on line 54 and signals on line 55 or 57 it is subsequently determined by electronic controller 50 that the signal on line 55 has transitioned as to indicate requested engine shutdown via ignition control 41, electronic controller 50 will examine the history of primary fuel and alternate fuel utilization as was monitored via line 54. If it is determined that alternate fuel 23 was not utilized within fuel transmission elements and component devices 27, 29, and 36, then electronic controller 50 will remain the passive state, thereby permitting engine shutdown. Otherwise, if it is determined that alternate fuel 23 was utilized within fuel transmission elements and component devices 27, 29, and 36, then electronic controller 50 will enter the active state, thereby precluding shutdown, unless the emergency ignition shutoff signal is asserted via line 56.

Figure 6:
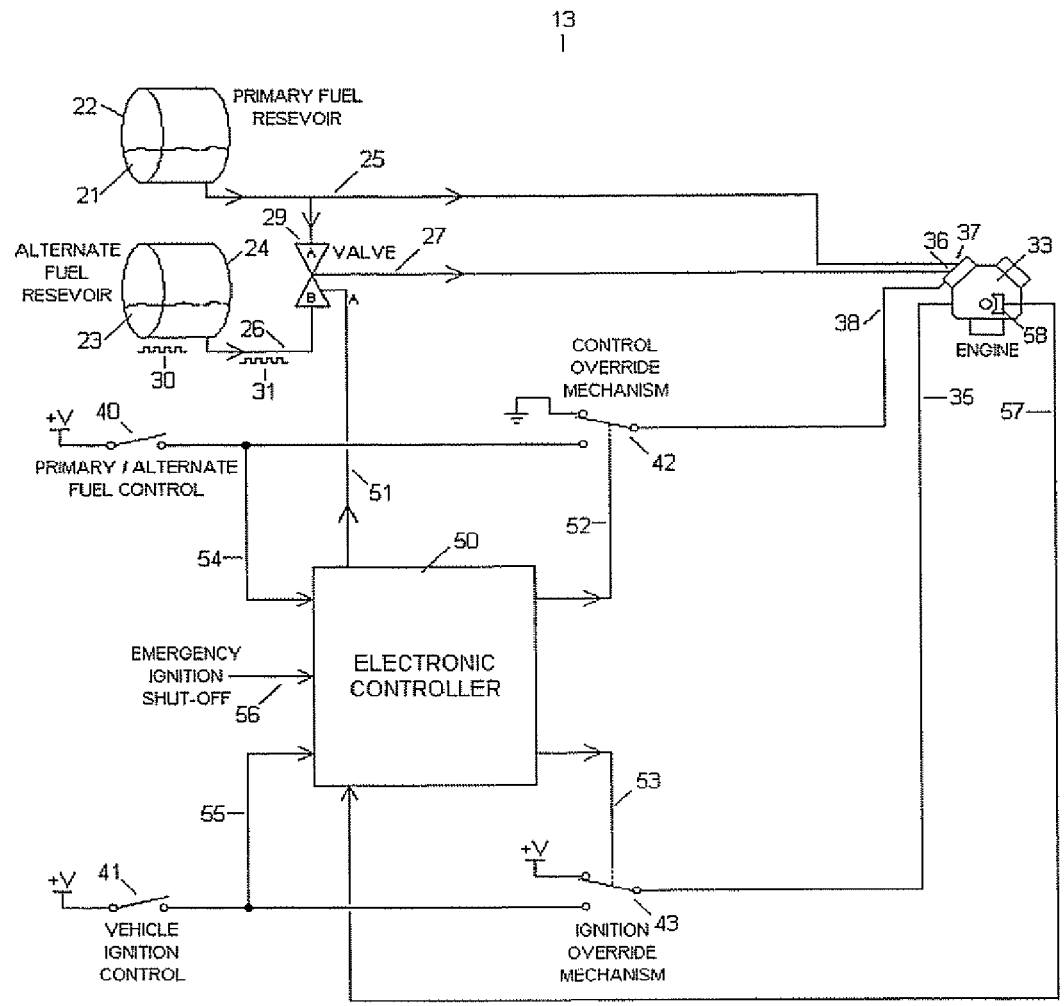
FIG. 6 is a schematic diagram of the alternate fuel system of FIG. 5, the system being shown in an active condition.

Referring to the drawings and, in particular, to FIG. 6, the fuel control system 13 is depicted in the active state vs. the passive state as previously shown in FIG. 5, and similarly interposed within the basic primary fuel and alternate fuel selection control structure prior as depicted in FIG. 4. All elements of FIG. 6 and the descriptions of such elements therein are identical to those of FIG. 5 and apply, however with notable exceptions being the state of control override mechanism 42 as controlled by a control signal on line 52, and the state of ignition override mechanism 43 as controlled by a control signal on line 53.

Whereupon having transitioned from the passive state as depicted in FIG. 5 to in the active state as depicted in FIG. 6 for reason of determination that alternate fuel 23 resides within fuel transmission elements and component devices 27, 29, and 36, electronic controller 50 asserts control signals on lines 51, 52 and 53. Assertion of a control signal on line 51 causes valve 29 to transition such that any fuel subsequently consumed by engine 33 via inlet 36 be comprised of primary fuel 21 or a mixture of primary fuel 21 and secondary fuel 23 of ratio sufficient to preclude congealment or solidification. Assertion of a control signal on line 52 causes control override mechanism 42 to substantially disregard the state of the primary alternate fuel control 40, and instead causes the control override mechanism 42 to output a signal via line 38 to engine 33 of appropriate form or construct such that alternate fuel inlet 36 is selected for fuel utilization, or a combination of alternate fuel inlet 36 and primary fuel inlet 37 sufficient to also induce flow at alternate fuel inlet 36 is selected. Furthermore, assertion of a control signal on line 53 causes control override mechanism 43 to substantially disregard the state of vehicle ignition control 41, and instead causes the control override mechanism 42 to output a signal via line 35 to engine 33 of appropriate from and construct such that engine 33 remains in a running state.

While in the active state as depicted in FIG. 6, assertion of control signals on lines 51, 52 and 53, and the respective transitioning of valve device 29 and assertion of override mechanisms 42 and 43 nominally continues for a period of time as determined by a threshold sufficient for primary fuel 21 or a mixture of primary fuel 21 and alternate fuel 23 sufficient to preclude congealment or solidification to enter and purge fuel transmission elements and component devices 27, 29, and 36. Upon expiration of said threshold, electronic controller 50 then ceases assertion of a control signal on line 51 causing valve device 29 to completely or substantially direct alternate fuel 23 from fuel transmission line 26 to fuel transmission line 27. Also upon expiration of said threshold, electronic controller 50 then ceases assertion of a control signal on line 52, causing control override mechanism 42 to completely or substantially pass, or completely or substantially reproduce, the signal as provided by the primary and alternate fuel control device 40, effectively passing or reproducing this signal engine 33 via a control signal on line 38. Furthermore, upon expiration of said threshold, electronic controller 50 then ceases assertion of a control signal on line 53, causing ignition override mechanism 43 to completely or substantially pass, or completely or substantially reproduce, the signal as provided by the vehicle ignition control device 41, effectively passing or reproducing this signal to the engine 33 ignition control input via a control signal on line 35.

Upon expiration of-said threshold and negation of assertion of control signals on lines 51, 52 and 53, the fuel control system 13 as depicted in FIG. 6 in the active state transitions back to the passive state as depicted in FIG. 5, whereupon it again waits for appropriate conditions as described for and depicted within FIG. 5 before again transitioning into the active state as described for FIG. 6, and so on.

If at any time during the active state as depicted in FIG. 6 the emergency ignition shutoff signal on line 56 is asserted by manual means or by automated sensors including but not limited to vehicle fire, collision, or rollover, the fuel control system 13 may unconditionally negate assertion of control signals on lines 51, 52 and 53 and enter the passive state.

If at any time during the active state as depicted in FIG. 6 electronic controller 50 senses repeated attempts or senses a pattern atypical of normal operation of vehicle ignition control 41 via a status signal on line 55, the fuel control system 13 may unconditionally negate assertion of control signals on lines 51, 52 and 53 and enter the passive state.

If at any time during the passive state as depicted in FIG. 5 or the active state as depicted in FIG. 6, the fuel control system 13 in part or total fails or loses electrical power, the system may be implemented such manner that it substantially emulates the passive state.

Many modifications and other embodiments of the inventions set forth herein will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

What is claimed is:

1. A fuel control system for controlling the purging of alternate fuel in an internal combustion engine at shutdown, comprising:
    at least one valve device configured to deliver a fuel supply to an engine;
    a first fuel source configured to provide a primary fuel to the at least one valve device;
    a second fuel source configured to provide an alternate fuel to the at least one valve device; and
    a controller connected to the at least one valve device and connected to an ignition system, the controller being configured to:
        control the at least one valve device to selectively deliver the primary fuel, the alternate fuel, or a mixture of the primary fuel and the alternate fuel, to the engine; and
        control the at least one valve device to selectively deliver the primary fuel to the engine to purge the alternate fuel in the engine responsive to a shutdown request status of one of the engine and the ignition system.

2. The fuel control system defined in claim 1, wherein the controller is configured to detect a duration that the engine operates, the duration ending with a signal from the ignition system to cease operation of the engine, and wherein the controller is configured such that it signals the engine to continue to operate if the duration is less than a threshold time period.

3. The fuel control system defined in claim 2, wherein the controller includes a sensor configured to sense engine operation.

4. The fuel control system defined in claim 2, further comprising fuel lines between the second fuel source and the engine, and wherein the controller signals the engine to continue to operate for a time sufficient to purge substantially all of the alternate fuel from the fuel lines.

5. The fuel control system defined in claim 1, wherein the controller is further configured such that receiving multiple cessation signals from the ignition system allows the engine to cease operation.

6. The fuel control system defined in claim 1, wherein the controller is further configured such that receiving an emergency ignition shutoff signal from an emergency stop signal source allows the system to cease operation.

7. The fuel control system of claim 1, wherein the controller is further adapted to control the at least one valve device to purge the alternate fuel from within the engine for a defined period of time.

8. The fuel control system of claim 7, wherein the controller is further adapted to control the at least one valve device when the shutdown request status has changed to shut down the engine.

9. The fuel control system of claim 1, wherein the controller is further adapted to:
    determine a utilization history of the primary fuel and the alternate fuel is sufficient to preclude congealment or solidification residing in fuel transmission elements or component devices;
    wherein the controller is further adapted to purge the primary fuel or the alternate fuel based on the utilization history of the primary fuel and the alternate fuel in response to the shutdown request status changing to shut down the engine.

10. The fuel control system of claim 1, wherein the controller is further adapted to control the at least one valve device to purge the alternate fuel when the at least one valve device directs the alternate fuel to the engine.

11. The fuel control system of claim 1, wherein the controller is further adapted to assert an active signal through an ignition override mechanism to prevent the engine from shutdown in response to the shutdown request status of the ignition system when the alternate fuel resides within the engine.

12. The fuel control system of claim 11, wherein the controller is further adapted to de-assert the active signal through the ignition override mechanism to permit the engine to shutdown in response to the shutdown request status of the ignition system.

13. An internal combustion engine assembly capable of operating on primary and alternate fuels, comprising:
    an internal combustion engine;
    a first fuel source connected to the engine;
    a second fuel source connected to the engine;
    a fuel control unit connected with the first and second fuel sources for regulating fuel to the engine;
    an ignition system; and
    a controller connected to the engine, the fuel control unit and the ignition system, the controller being configured to control the fuel control unit responsive to a shutdown request status of one of the engine and the ignition system;
    the controller further adapted to be able to selectively deliver a primary fuel, an alternate fuel, or a mixture of the primary fuel and the alternate fuel, to the engine; and
    the controller further adapted to control at least one valve device to selectively deliver the primary fuel to the engine to purge the alternate fuel in the engine in response to the shutdown request status of the one of the engine and the ignition system.

14. The engine assembly defined in claim 13, wherein the controller is configured to detect a duration that the engine operates, the duration ending with a signal from the ignition system to cease operation of the engine, and wherein the controller is configured such that it signals the engine to continue to operate if the duration is less than a threshold time period.

15. The engine assembly defined in claim 13, wherein the controller includes a sensor configured to sense engine operation.

16. The engine assembly defined in claim 13, wherein the controller signals the engine to continue to operate for a time sufficient to purge substantially all of the alternate fuel from fuel lines connecting the second fuel source to the engine.

17. The engine assembly defined in claim 13, wherein the controller is further configured such that receiving multiple cessation signals from the ignition system allows the engine to cease operation.

18. The engine assembly defined in claim 13, wherein the controller is further configured such that receiving an emergency ignition shutoff signal from an emergency stop signal source allows the system to cease operation.

19. The engine assembly defined in claim 13, wherein the fuel control device includes a valve.

* * * * *